(12) United States Patent
Bushee

(10) Patent No.: US 9,013,100 B2
(45) Date of Patent: Apr. 21, 2015

(54) COMPACT LIGHTING SYSTEM

(76) Inventor: Glenn Bushee, Duxbury, MA (US)

( * ) Notice: Subject to any disclaimer, the term of this patent is extended or adjusted under 35 U.S.C. 154(b) by 0 days.

(21) Appl. No.: 13/395,612

(22) PCT Filed: Feb. 22, 2011

(86) PCT No.: PCT/US2011/025668
§ 371 (c)(1),
(2), (4) Date: Mar. 12, 2012

(87) PCT Pub. No.: WO2011/109185
PCT Pub. Date: Sep. 9, 2011

(65) Prior Publication Data
US 2012/0318985 A1    Dec. 20, 2012

Related U.S. Application Data (60) Provisional application No. 61/339,232, filed on Mar. 2, 2010.

(51) Int. Cl.
| | |
|---|---|
| H01J 1/62 | (2006.01) |
| F21V 21/08 | (2006.01) |
| A01K 27/00 | (2006.01) |
| A01K 85/01 | (2006.01) |
| A01K 91/06 | (2006.01) |
| A42B 3/04 | (2006.01) |
| F21L 4/00 | (2006.01) |
| A41D 13/01 | (2006.01) |
| A41D 19/015 | (2006.01) |
| F21V 33/00 | (2006.01) |
| F21W 111/10 | (2006.01) |
| F21W 131/30 | (2006.01) |
| F21Y 101/02 | (2006.01) |

(52) U.S. Cl.
CPC ........... *F21V 21/0808* (2013.01); *A01K 27/006* (2013.01); *A01K 85/01* (2013.01); *A01K 91/06* (2013.01); *A41D 13/01* (2013.01); *A41D 19/0157* (2013.01); *A42B 3/044* (2013.01); *F21L 4/00* (2013.01); *F21V 21/0832* (2013.01); *F21V 33/0008* (2013.01); *F21W 2111/10* (2013.01); *F21W 2131/30* (2013.01); *F21Y 2101/02* (2013.01)

(58) Field of Classification Search
CPC .......... G08B 27/00; G08B 5/004; G08B 7/06; B60T 11/22; F21V 25/00; F21V 23/04; F21V 21/012; F21V 21/092; F21V 21/096; F21V 21/0965; F21V 33/0004; F21V 33/0052; F21V 33/0056; F21V 33/0076; F21V 33/005; F21V 33/008
USPC .......................... 362/103, 106, 225, 235, 249
See application file for complete search history.

(56) References Cited

U.S. PATENT DOCUMENTS

| | | | |
|---|---|---|---|
| 2007/0133219 A1* | 6/2007 | Chaloult et al. | 362/490 |
| 2007/0153525 A1* | 7/2007 | Helget et al. | 362/276 |

(Continued)

FOREIGN PATENT DOCUMENTS

| | | | |
|---|---|---|---|
| KR | 200339420 Y1 | 1/2004 | |
| KR | 200350944 Y1 | 5/2004 | |
| KR | 200361944 Y1 | 9/2004 | |

*Primary Examiner* — Andrew Coughlin
(74) *Attorney, Agent, or Firm* — Lawrence J. Shurupoff (57) ABSTRACT

An integral battery, light and light switch assembly can be removably fitted within a light-transmitting pocket on an article of clothing, such as a glove. Alternatively, the assembly can be mounted to virtually any surface with an adhesive or hook and loop fastener. In one application, the assembly can be attached to fishing tackle to attract fish. The assembly is particularly useful for nighttime use by those in the vicinity of traffic, including police, fire and ambulance workers as well as runners and cyclists. The assembly can also be used to mark a trail or identify a location in the dark. Infrared lighting can be used for tactical operations.

16 Claims, 5 Drawing Sheets

(56) References Cited

U.S. PATENT DOCUMENTS

2007/0291473 A1* 12/2007 Traynor .................. 362/106
2008/0130272 A1* 6/2008 Waters .................... 362/106
2009/0109677 A1* 4/2009 Coushaine et al. ......... 362/267
2009/0251077 A1* 10/2009 Wilborn et al. ............ 315/313
2010/0039243 A1* 2/2010 Tuan ...................... 340/326
2010/0097897 A1* 4/2010 Chien ..................... 368/67

* cited by examiner

COMPACT LIGHTING SYSTEM

BACKGROUND AND SUMMARY

A need exists for a compact, lightweight portable lighting system which is low in cost so as to allow for single use applications. A further need exists for such a lighting system that is optionally reusable and which can be selectively turned on and off to conserve battery power and extend the operating life of the lighting system.

In accordance with this disclosure, a compact lighting system has been developed which can be carried on or removably applied to a substrate such as clothing, shoes, hats, helmets, gloves, shirts, pants, belts and the like to assist in alerting others of the presence of a person located in dim or dark lighting (in the dark). The compact lighting system can also be used as a location marker to provide a light signal at a chosen location such as marking a trail or marking a specific position or building or identifying the condition of a particular location with the use of the lighting system.

For example, the compact lighting system disclosed herein can be used by military and law enforcement to indicate whether or not a room, cell, building, or a natural or manmade structure has been "cleared". One color light can indicate a "safe" condition while another color can indicate a location which has not been cleared or checked for hazards. Ultraviolet and infrared lighting can be used for tactical and military applications. Specific applications for the subject compact lighting system include an illuminated glove for directing traffic at night, illuminated helmets, safety vests, running shoes, shirts, pants, belts, or any application where the safety of an individual can be improved by a warning light. This includes use by construction workers, highway maintenance workers, joggers, cyclists, motorcyclists, airport workers, firemen, emergency responders such as ambulance workers, emergency medical technicians (EMT) and any others in proximity to traffic, construction equipment, machinery and other potential hazards.

In further accordance with this disclosure, an easy-to-operate compact lighting system is provided with a removable mounting for easy convenient use on virtually any surface. The lightweight system can be hermetically sealed in a clear or translucent pouch or covered with a waterproof coating for protection against vibration, shock, harsh environments and moisture. The outer surface of the pouch overlying an on-off light switch may be textured to allow an operator to easily locate and operate the light switch solely by feel in either the light or in the dark.

Because of the compact size of the light assembly, it can be applied to fishing line, fishing lures and other fishing tackle to attract and catch fish.

BRIEF DESCRIPTION OF THE DRAWINGS

In the drawings.

In the various views of the drawings, like reference numerals designate like or similar parts.

DESCRIPTION OF REPRESENTATIVE EMBODIMENTS

Figure 1:
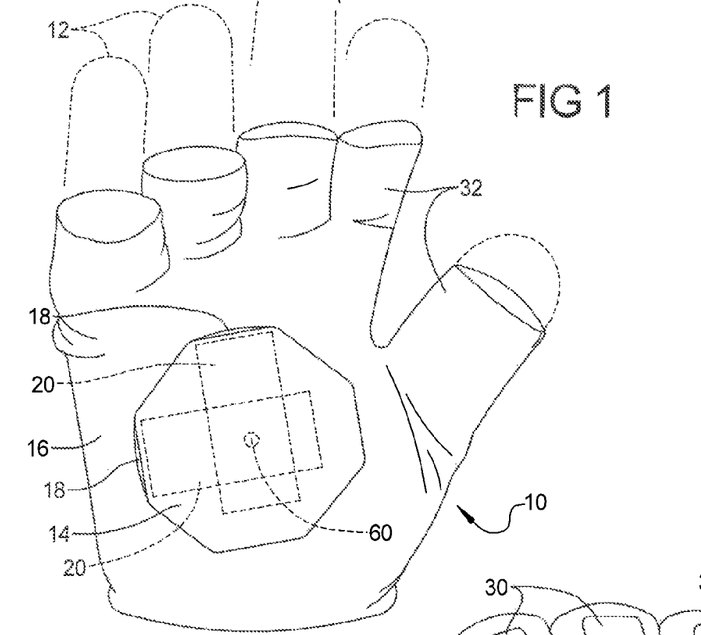
FIG. 1 is a schematic front or palm view of a glove fitted with a compact lighting assembly in accordance with one embodiment of the disclosure.

A representative application of the subject lighting system is shown in FIG. 1, wherein a glove 10 is formed in a known fashion of a woven or nonwoven material such as a stretchable breathable mesh material. The glove 10 can be formed with or without finger tip portions 12. A translucent and preferably light-reflective pocket 14 is sewn, bonded or otherwise mounted to the front or palm portion 16 of the glove 10. The pocket 14 can be fabricated from alight-transmitting reflective sheet of thin flexible plastic material which may be smooth surfaced or grooved, checkered or otherwise textured to enhance light diffusion. One or more openings or slits 18 are formed along the border of the pocket 14 for snugly receiving a battery, light and switch assembly 20, as discussed further below. Assembly 20 is shown in rectangular dashed lines in FIG. 1 in two different possible mounting positions (horizontal and vertical).

Figure 2:
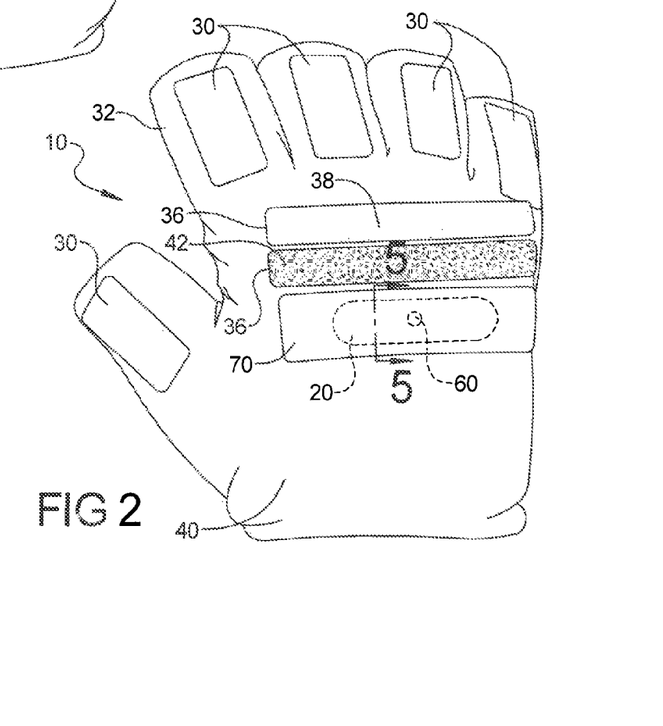
FIG. 2 is a schematic rear or back hand view of FIG. 1.
Figure 3:
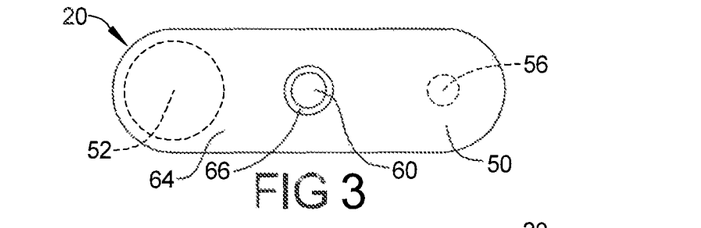
FIG. 3 is a front view of an integral battery, light and switch circuit assembly.
Figure 4:
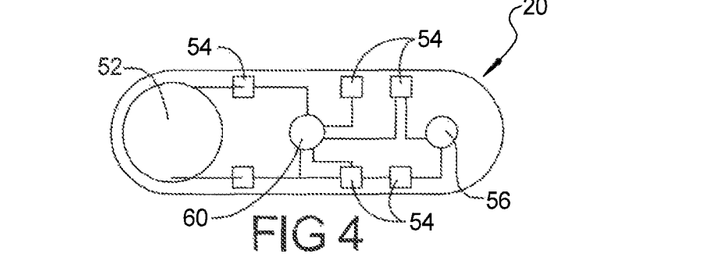
FIG. 4 is a rear view of FIG. 3.

The back of the glove 10 is shown in FIG. 2. Strips of light-reflective plastic or metal foil material 30 are sewn, bonded or otherwise attached to the back surface of the glove fingers 32. Attachment or mounting strips or pads 36 coated on their outer surfaces with adhesive material 38 or provided with other connectors can be removably or permanently mounted to the rear surface 40 of the glove 10 such as by sewing. The tacky adhesive coating 38 allows for the removable mounting of an integral battery, light and switch assembly 20. Alternatively, strip 36 can be provided with a hook and loop fabric fastening surface 42 to receive hook and loop fasteners provided on the back of the battery, light and switch assembly 20, or on a pocket which carries assembly 20. One embodiment of a compact, lightweight battery, light and switch assembly 20 is shown in FIGS. 3 and 4. A thin, semiflexible, laminated, shiny, mirror-like, light-reflecting substantially planar sheet 50 of plastic acts as a platform, planar base or flat circuit board for holding a thin "button" battery 52 soldered or otherwise fixed to its front or rear surface. Sheet 50 is advantageously formed of a waterproof sheet or foil to protect microcircuitry 54 carried on platform 50. The battery 52 is electrically connected to switching microcircuitry 54 which is controlled by a user-operated button switch 56. The microcircuitry 54 can be further waterproofed with a layer of epoxy and covered by a thin sheet of rigid plastic. The rigid plastic sheet can be staked to the sheet 50 with pins or rivets to increase the strength of the laminated assembly.

In another embodiment, sheet 50 is formed with a nonreflective, black or matte black surface when the lighting assemble 20 operates with an infrared light. A flat black surface coating can be applied to planar sheet 50 to improve and enhance the detection of infrared light signatures when using an infrared viewer such as night vision goggles. The sequential actuation of button switch 56 causes the microcircuitry 54 to apply power to a light-emitting diode (LED) or other miniature electric light 60 in various operating modes. For example, a first actuation or depression of button switch 56 can trigger circuitry 54 to apply full constant power to the LED 60 for a bright constant light. A second depression of button switch 56 can trigger circuitry 54 to apply less than full constant power to the LED 60 for a longer-lasting low-power lighting.

Other sequential operating modes can include a rapidly strobed or pulsed light mode, a slowly strobed or pulsed light mode, a high power strobed or blinking light mode, a low power strobed or blinking light mode and a power off mode to turn off the LED light. The button switch 56 can be mounted on either the front or rear surface of the assembly 20 and is easily depressed and actuated by pressing down on any flexible covering material overlying button switch 56 or by directly pressing button switch 56, if it is exposed. As noted above, the button switch 56 can be located on either the front or rear surface of sheet 50. This allows an operator to actuate the button switch 56 from the front or rear surface of sheet 50, depending on the application or end use of lighting assembly 20.

To maximize the visible lighting emitted from the assembly 20, the reflective front surface 64 (FIG. 3) of the sheet 50 is formed with a highly reflective mirror-like surface finish or coating. This can take the form of a thin shiny metal foil or a layer of light-reflecting paint. An aperture or port 66 (FIG. 3) is formed through sheet 50 to allow for the unobstructed passage of light from LED light 60.

Figures 8, 9:
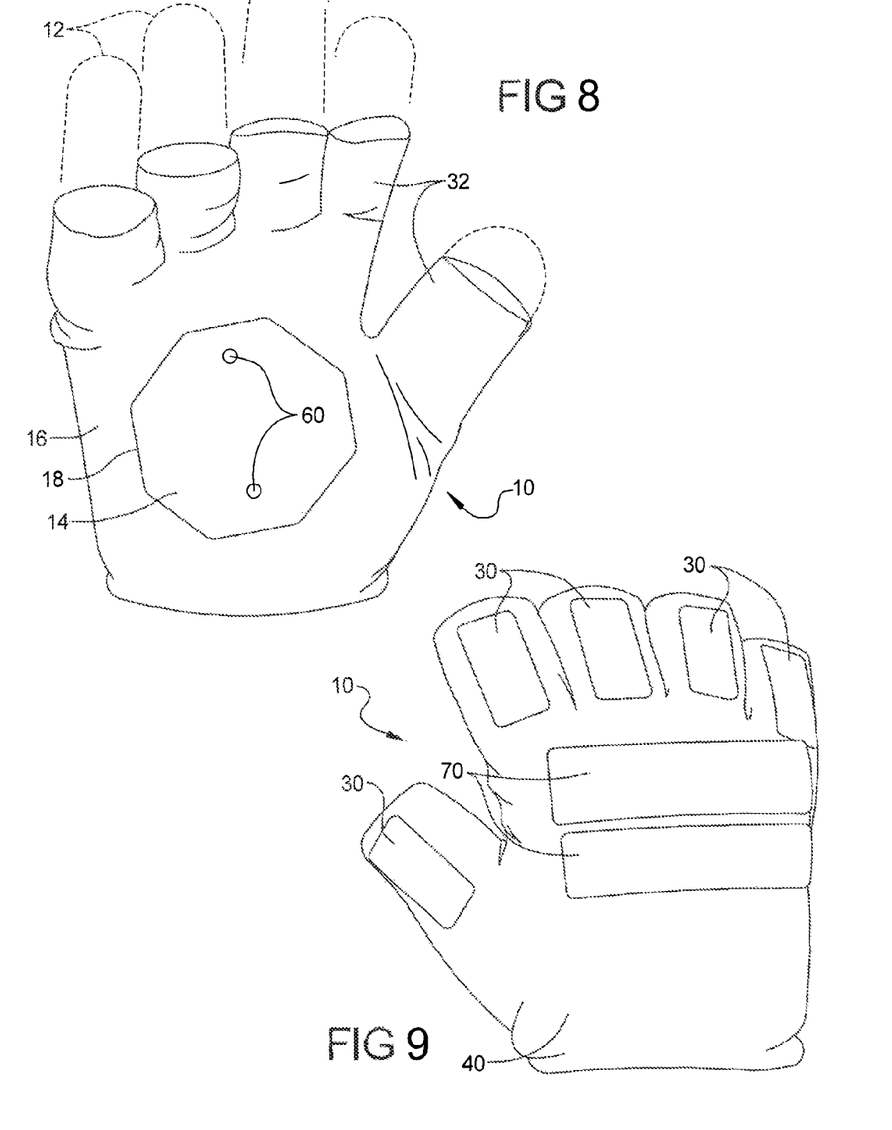
FIGS. 8 and 9 are perspective front and rear views of a glove as represented in FIGS. 1 and 2 with lighting assemblies removably secured to the glove.

As seen in FIGS. 8 and 9, lighting assembly 20 can be directly attached to the glove 10 by pressing the lighting assembly 20 against a tacky surface 38 (FIG. 2) provided on the outer surface of the glove (FIG. 2) or inserted into a translucent pocket on glove 10, such as into pocket 14 (FIGS. 1 and 8) through an opening or slit 18 communicating with the interior of pocket 14.

Figure 5:
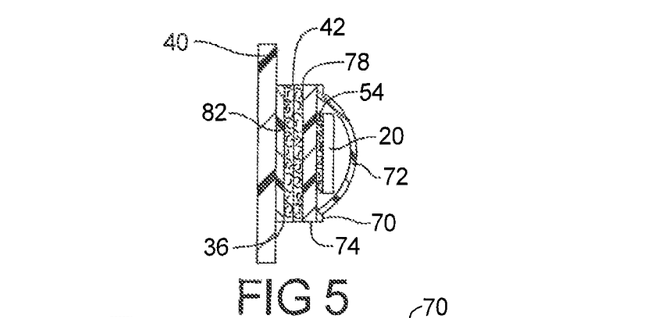
FIG. 5 is a view in a section taken along section line 5-5 of the assembly of FIG. 2 fitted within a removable easing.

Another mounting method is shown in FIGS. 2, 5 and 9 where the assembly 20 is removably mounted to glove 10 with an integral adhesive layer or, as further shown, with a hook and loop releasable fabric connection. The assembly 20 can be fitted within a pouch or flexible casing 70. Pouch 70 can be hermetically sealed around the lighting assembly 20 to protect the lighting assembly 20 from shock, vibration, exposure to ambient moisture, liquids, dust and the like. The outer surface or ply 72 of casing 70 can be coated or formed of a translucent light-reflecting plastic material such as an ANSI class 2 material or simply formed of a clear sheet of plastic. This material can be used for pocket 14 (FIG. 1) as well. In the event the LED 60 becomes inoperative, surface 64 (FIG. 3) will still brightly reflect light from auto headlights, flashlights and the like to provide a secondary level of safety in those applications where visible light is provided by LED 60.

As seen in FIG. 5, the rear surface or ply 74 of casing 70 can be covered with an integral flexible hook and loop fabric material 78 of the type marketed under the brand Velcro. As further seen in FIGS. 2 and 5, an attachment strip 36 of adhesive or tacky material can be permanently or removably coupled, glued, bonded, sewn clipped or otherwise attached or coupled to a substrate such as to the glove 10 such as on the front portion 16 (FIG. 1) or on the rear surface portion 40 as shown in FIG. 5. In FIG. 5, an adhesive backing 82 is provided on a strip of Velcro material 42 and permanently or removably attached or bonded to the rear outer surface 40 of the glove 10 for removably mounting the lighting assembly 20 to the glove 10. Surface portion 40 in FIG. 5 can also represent the surface of any substrate such as a building or other structure or any article worn or carried by a person including a glove, a shoe, a vest, a shirt, a jacket, a hat, a helmet, pants, and belts. The outer surface portion 40 can also represent virtually any surface or substrate or article including articles worn by animals, such as collars, harnesses, clothing and the like.

With attachment strip 36 in place on surface 40 of glove 10, casing or pouch 70 can be quickly and easily mounted and demounted from glove 10 or any other substrate with a simple press for installation and a simple pull or peel for removal, as the hook and loop materials 78 and 42 respectively engage and disengage from each other. When the battery 52 in assembly 20 is exhausted, an operator need only remove one casing 70 with a simple pull and quickly and easily mount a fresh casing or pouch 70 onto mounting strip 36 with a simple push or press fit. The same easy mounting and demounting is afforded by the adhesive backing 82 discussed below.

It should be noted that attachment strip 36 can be permanently or removably applied to virtually any surface for receiving and holding in place a lighting assembly 20 or a lighting assembly 20 fitted in a casing or pouch 70. Once the attachment or mounting strip 36 is in place, a casing or pouch 70 with an integral lighting assembly 20 can be quickly mounted to and demounted from the attachment strip 36 and underlying substrate to which the attachment strip is applied.

Figure 6:
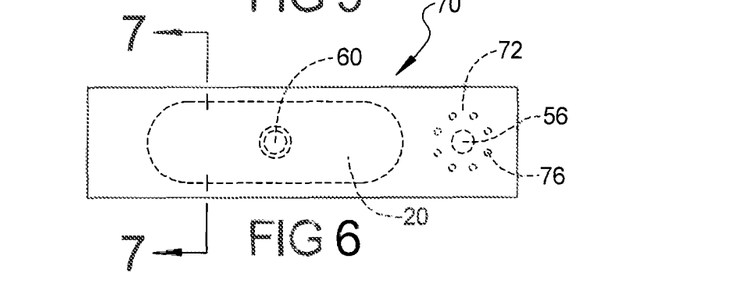
FIG. 6 is a front view of an integral battery, light and switching assembly fitted within a removable mounting strip.
Figure 7:
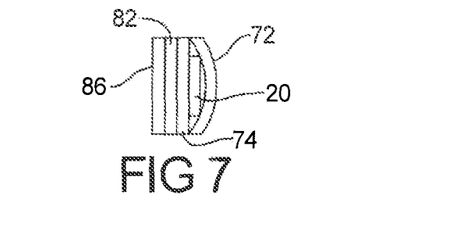
FIG. 7 is a view in cross section taken through section line 7-7 of FIG. 6 and showing a complementary adhesive mounting strip.

As seen in FIGS. 6 and 7, a hollow hermetically-sealed and waterproof casing or pouch 70 having an adhesive backing 82 is provided with a peel-off cover 86 similar to that used on adhesive bandages of the "Band Aid" variety. Cover 86 can be removed when required and casing 70 can be adhesively mounted in the manner of an adhesive strip on virtually any surface, such as to walls, floors, articles of manufacture, trees, rocks, clothing, footwear, warning signs, police, firemen and construction helmets and other "hard hats" as well as any other substrate such as those noted above.

Figure 13:
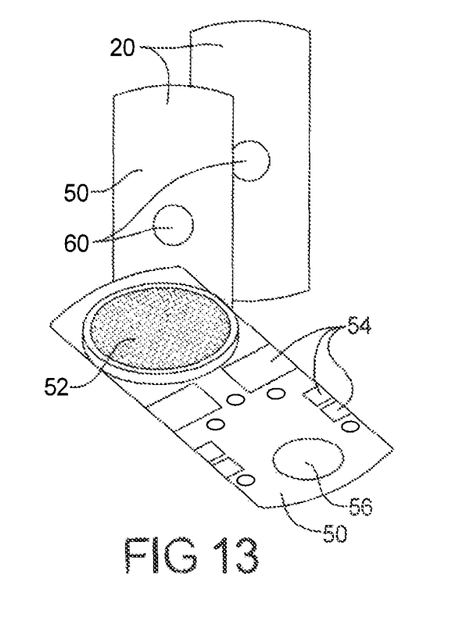
FIG. 13 is a schematic perspective view of lighting assemblies without any cover or pouch and shown approximately to scale at actual size.

In one embodiment, the length of the pouch or casing 70 is less than about two inches, i.e. about 1.75 inches (4.44 cm), the height of casing or pouch 70 is less than about one inch (2.54 cm), i.e., about 0.75 inch (1.90 cm) and the thickness through the pouch and assembly 20 as seen in FIG. 7 is less than one quarter inch, i.e., about 0.125 inch (0.317 cm). The combined weight of the pouch 70 and assembly 20 of FIGS. 6 and 7 is less than 10 grams, i.e., about 5 grams. Because of the small size and weight of this lighting assembly, a dozen or more assemblies can be conveniently carried in one's pocket to mark a trail by placing a lighting assembly 20 in at least one location or in a series of spaced-apart locations on the ground or mark other locations as desired. One simply activates the light 60 by actuating switch 56 and placing the lighting assembly on a substrate at a position or location to be marked. If provided with an adhesive hacking 82, the lighting assembly 20 can be pressed onto a desired substrate to be marked to hold the light assembly on a desired spot, such as a wall, a door, a tree, etc. Of course, one or more lighting assemblies 20 as shown in FIG. 13 need not be enclosed in a pouch 70. These simpler assemblies can be simply laid on the ground or on an object to provide a low cost lighted marker.

Figure 10:
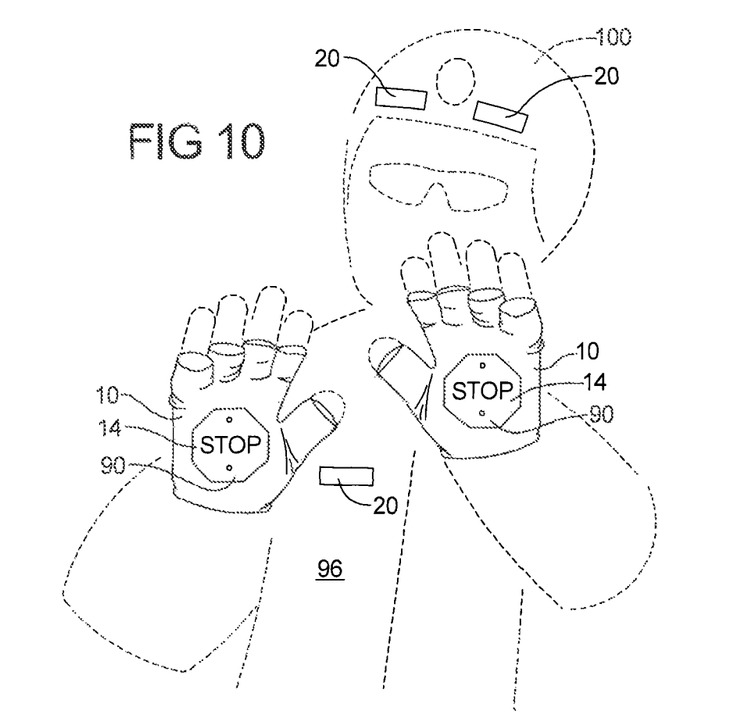
FIG. 10 is a perspective view of a representative application of the glove of FIGS. 8 and 9 and showing use of a lighting assembly such as shown in FIG. 6 applied to clothing and to a helmet.

As further seen in FIG. 6, the portion of the outer surface of pouch 70 overlying the switch 56 can be textured such as with ridges and grooves or a series of dimples 76 to enable a user to easily locate and operate switch 56 solely by tactile feel without looking at pouch 70. This is most useful when operating lighting assembly 20 in the dark. As further seen in FIGS. 8 and 10, gloves 10 are provided with pockets 14 shaped as octagonal stop signs. The Clear translucent plastic material of each pocket 14 can be partially colored red in the manner of a stencil around the clear letters "STOP", which will clearly contrast with their surrounding red background. In this embodiment, two or more assemblies 20 can be inserted within each pocket 14 to provide increased lighting. As further seen in FIG. 10, the lighting assemblies 20 can be applied to a shirt, vest or jacket 96, and to a helmet 100.

Figure 11:
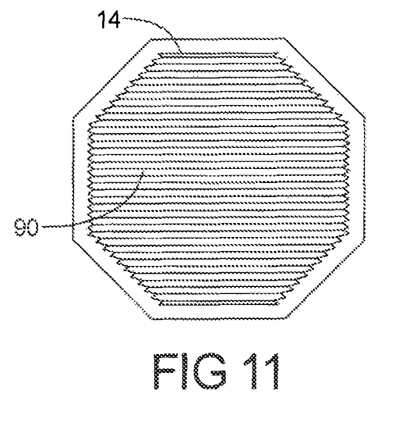
FIG. 11 is a front view of a textured translucent plastic material suitable for forming pockets or coverings over the lighting assembly of FIGS. 1 and 3.

To further enhance the visibility of the letters "STOP", the inner or outer surface of the translucent material forming each pocket 14 can be formed with a grooved and ribbed surface 90 (FIG. 11) or other textured or contoured surface to diffract and/or diffuse the light from the LED's 60. The resulting light emitted from the letters "STOP" is diffused so as to enhance or more clearly depict the letters.

Figure 12:
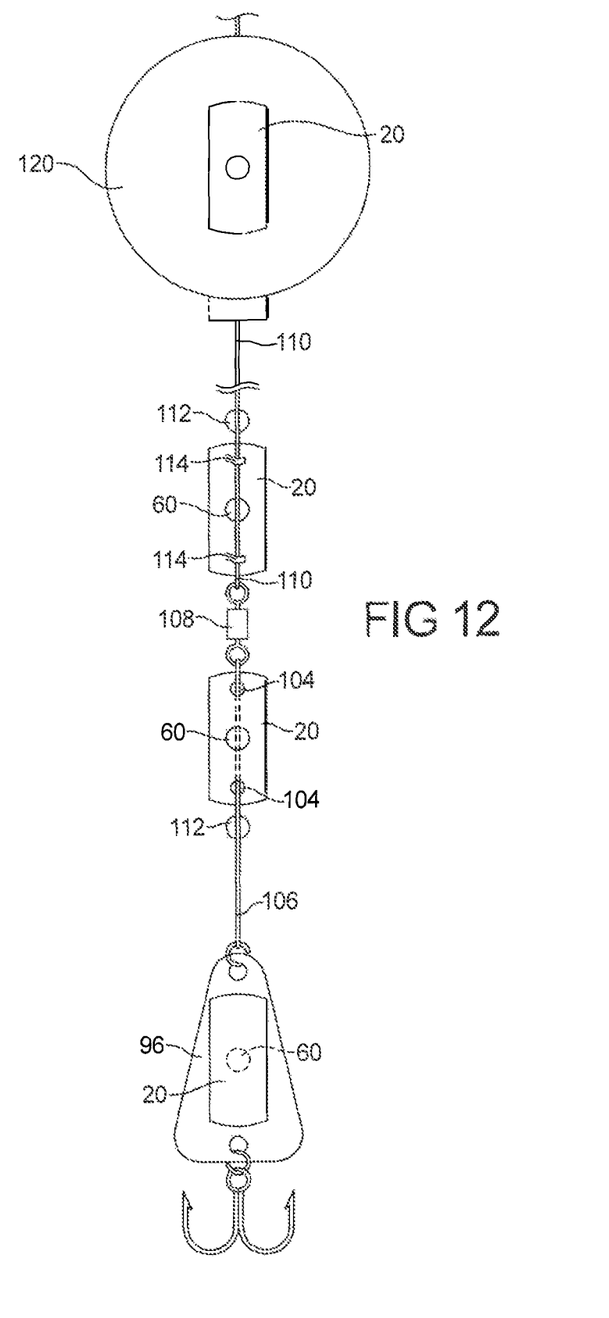
FIG. 12 is a view of a compact lighting assembly carried by a fishing lure and other fishing tackle.

Another application of the lighting assembly 20 is shown in FIG. 12, wherein the light assembly 20 is coupled to a fishing lure 96, such as with an adhesive water-resistant attachment layer such as adhesive coatings 38 and 82 noted above. Different colored LEDs 60 can be removably or permanently coupled to a fishing lure 96, or to a bobber, float, leader, line or other tackle to attract fish to the lure or bait.

The lighting assembly 20 of FIGS. 6 and 7 is well adapted for fishing applications due to its waterproof casing or pouch 70. The flashing or strobed feature of the lighting assembly is particularly useful when applied to fishing tackle or when simply dropped in the water to attract fish. In one application, a pair of light assemblies 20 can be connected to each other by pressing their adhesive backings 82 together with a fishing line or leader sandwiched between the adhesive backings 82 so as to secure the pair of light assemblies to the line or leader.

As further seen in FIG. 12, a lighting assembly 20 can be formed with mounting holes 104 allowing for a threaded connection to a fishing leader 106. A swivel 108 can be used to interconnect the leader 106 to a fishing line 110. A split shot sinker or other sinker or tackle can also be used to fix or otherwise locate the lighting assembly 20 on the leader 106 as well as to the line 110. Spring clips 114 can also be provided on the lighting assembly 20 to clip the leader 106 and/or line 110 to the lighting assembly 20. A lighting assembly 20 can also be coupled to a bobber or float 120 for further attracting fish, particularly at night. Different colored LED lights can be provided on different lighting assemblies 20 to match a particular colored light 60 to a particular fishing condition. Colors such as red, green, and white can be easily interchanged on fishing lures or other fishing tackle to find the best colored light for a particular fishing condition.

There has been disclosed heretofore the best embodiment of the disclosure presently contemplated. However, it is to be understood that various changes and modifications may be made thereto without departing from the spirit of the disclosure. For example, light 60 can be an ultraviolet light, an infrared light as well as a visible light. Lighting assemblies 20 can also be coupled to canes, vehicles, wheelchairs, boats, canoes, kayaks, and backpacks.

What is claimed is:

1. An illuminated laminated compact lighting assembly comprising an integral battery, LED and light switch electrically connected on a circuit board and interconnected by switching microcircuitry carried on said circuit board, said switching microcircuitry selectively controlled by said switch and waterproofed with a cover layer of plastic, said assembly being configured for coupling to a substrate;
   a visibility enhancing surface portion located around said LED and selected from the group consisting of a black surface portion improving detection of infrared light emitted from said LED and a shiny light reflective surface portion improving visibility of visible light emitted from said LED and serving as a light reflector upon said LED becoming inoperative;
   said switch mounted on said circuit board and selectively causing said microcircuitry to operate said LED in a plurality of operating modes including a strobed or pulsed light mode;
   a flexible plastic pouch hermetically sealed around and enclosing said circuit board to provide protection from shock, vibration, moisture, liquids and dust; and
   wherein said LED is selectively activated by pressing on said flexible plastic pouch to apply pressure to said light switch with said flexible plastic pouch and wherein said assembly has a thickness of less than about one quarter inch.

2. The assembly of claim 1 wherein said assembly is releasably coupled to said substrate with a peel-off tacky adhesive backing coupling and said substrate comprises an article worn by a person or worn by an animal.

3. The assembly of claim 1, wherein said flexible plastic pouch comprises an outer surface portion overlying said switch and textured with a plurality of ridges and grooves or dimples to enable a user to easily locate and operate said switch solely by tactile feel without looking at said flexible plastic pouch.

4. The assembly of claim 1, wherein said flexible plastic pouch comprises a light-transmitting ribbed and grooved textured surface portion to enhance visibility of said LED.

5. The assembly of claim 1, wherein said flexible plastic pouch comprises a length of less than about two inches and a height of less than about one inch so as to enable a dozen or more of said assemblies to be conveniently carried in a person's pocket.

6. The assembly of claim 1, wherein said shiny light reflecting surface portion comprises a shiny metal foil having a hole formed therein for the passage of visible light.

7. The assembly of claim 1, wherein said cover layer is staked to said circuit board with pins or rivets to strengthen said assembly.

8. The assembly of claim 1, further comprising a tacky adhesive carried by said pouch for coupling said assembly to said substrate and a removable peel off cover provided over said tacky adhesive.

9. A laminated light assembly having a thickness of less than about one quarter inch and weighing less than about 10 grams and comprising a waterproof circuit board, a light carried by the circuit board, a battery carried by the circuit board, a switch carried by the circuit board, a circuit connecting said light, said battery and said switch, a waterproof layer of epoxy over said circuit, a layer of plastic covering said circuit and said epoxy and forming a strengthened laminated light assembly with said circuit board, a flexible plastic pouch comprising a first ply of plastic sheet material hermetically sealed to a second ply of plastic sheet material, said first and second plys hermetically sealed around and enclosing said circuit board, said light, said battery, said switch, said waterproof layer and said layer of plastic, and a tacky adhesive layer on said flexible plastic pouch.

10. The laminating light assembly of claim 9, wherein said light produces visible light, and wherein said light assembly further comprises a shiny light reflecting surface around said light.

11. The laminating light assembly of claim 9, wherein said laminated light assembly further comprises a flat black surface portion and wherein said light comprises an infrared light.

12. An illuminated laminated waterproofed lighting assembly, comprising:
- a waterproofed platform;
- a battery, an LED and a light switch each mounted on said waterproofed platform;
- switching microcircuitry carried on said platform and interconnecting said battery, said LED and said light switch, said switching microcircuitry selectively controlled by said switch;
- a waterproof layer applied over said switching microcircuitry and waterproofing said switching microcircuitry carried on said platform;
- said waterproofed platform and said waterproof layer staked together with rivets or pins and thereby forming a strengthened laminated waterproof assembly;
- a waterproof pouch having a length of less than about two inches, a height of less than about one inch and a width of less than about one quarter inch and wherein said lighting assembly is carried inside of said waterproof pouch; and
- wherein said light assembly has a weight of less than about 10 grams.

13. The lighting assembly of claim 12, wherein said switching microcircuitry selectively operates said light in a pulsing.

14. The lighting assembly of claim 12, wherein said LED emits infrared light and further comprising a flat black surface surrounding said LED to enhance visibility of said infrared light.

15. The lighting assembly of claim 12 further comprising a shiny mirror surface surrounding said LED increasing visibility of visible light emitted from said LED.

16. The lighting assembly of claim 12, further comprising a shiny metal foil laminated on said platform and having a hole formed therein for the passage of light from said LED.

* * * * *